(12) United States Patent
Liao

(10) Patent No.: US 11,403,113 B2
(45) Date of Patent: Aug. 2, 2022

(54) SERVER WITH SYSTEM SETTING DATA SYNCHRONIZATION FUNCTION

(71) Applicant: MITAC COMPUTING TECHNOLOGY CORPORATION, Taoyuan (TW)

(72) Inventor: Yuan-Jhang Liao, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 31 days.

(21) Appl. No.: 17/201,739

(22) Filed: Mar. 15, 2021

(65) Prior Publication Data
US 2021/0311747 A1 Oct. 7, 2021

(30) Foreign Application Priority Data
Apr. 7, 2020 (TW) ................................ 109111670

(51) Int. Cl.
*G06F 9/44* (2018.01)
*G06F 9/4401* (2018.01)
*G06F 9/445* (2018.01)
*G06F 11/22* (2006.01)
*H04L 67/1095* (2022.01)

(52) U.S. Cl.
CPC ........ *G06F 9/4416* (2013.01); *G06F 9/44505* (2013.01); *G06F 11/2284* (2013.01); *H04L 67/1095* (2013.01)

(58) Field of Classification Search
CPC .................................... G06F 1/32; G06F 9/44
See application file for complete search history.

(56) References Cited

U.S. PATENT DOCUMENTS

| | | | | |
|---|---|---|---|---|
| 2003/0236970 A1* | 12/2003 | Palmer | ...................... | H04L 9/40 719/321 |
| 2014/0189337 A1* | 7/2014 | Lin | ........................ | G06F 9/4418 713/2 |
| 2015/0113263 A1* | 4/2015 | Wu | ......................... | G06F 8/654 713/100 |

FOREIGN PATENT DOCUMENTS

| CN | 104092777 A | 10/2014 |
|---|---|---|
| TW | I623834 B | 5/2018 |

* cited by examiner

Primary Examiner — Keshab R Pandey
(74) Attorney, Agent, or Firm — Rabin & Berdo, P.C.

(57) ABSTRACT

A local server is provided. The local server includes a BIOS memory and control circuit. The BIOS memory stores a BIOS code and an actual setting data. The control circuit reads a current setting data corresponding to the local server from a cloud server in a POST procedure of the local server, and compares the actual setting data with the current setting data, and when the actual setting data does not match the corresponding current setting data, the control circuit sends the actual setting data to the cloud server, so that the actual setting data overwrites the current setting data in the cloud server.

20 Claims, 4 Drawing Sheets

SERVER WITH SYSTEM SETTING DATA SYNCHRONIZATION FUNCTION

CROSS-REFERENCE TO RELATED APPLICATION

This non-provisional application claims priority under 35 U.S.C. § 119(a) to Patent Application No. 109111670 filed in Taiwan, R.O.C. on Apr. 7, 2020, the entire contents of which are hereby incorporated by reference.

BACKGROUND

Technical Field

The present disclosure relates to a server, in particular to a server of setting data of BIOS setting options.

Related Art

With the development of technology, the amount of information that people need to store has greatly expanded, and cloud storage or cloud backup based data centers have been widely used. That is, multiple cloud servers are provided and managed by a third party, and users store data in the large-scale data center operated by the aforementioned third party in an on-line storage manner to meet data storage needs, so that the users do not need to install physical external storage devices in the office, thereby greatly reducing the equipment and management cost.

When companies or individuals manage their workstation servers, they can also use the aforementioned cloud server to store actual system settings of the workstation server, which helps the administrator to quickly refer to the current system settings recorded in the cloud server. Thereby, the administrator can log into the cloud server through the network to refer to the current system settings corresponding to the workstation server, and modify the current system settings stored in the cloud server through the network. Thus, in the process of restarting the workstation server, the workstation server loads the modification made by the cloud server to the current system settings from the cloud server, so as to indirectly modify the actual system settings of the workstation server. However, the administrator can also modify the actual system settings of the workstation server in another manner. That is, the administrator can directly modify the actual system settings of the workstation server off-line through input device or a computer connected to the workstation server. However, supporting two modification manners (direct/indirect) at the same time may easily cause the problem that the actual system settings are inconsistent with the current system settings. If the administrator modifies the current system settings stored in the cloud server by taking the current system settings that are stored in the cloud server and inconsistent with the actual system settings of the workstation server as the actual system settings of the workstation server in a situation where the actual system settings are inconsistent with the current system settings, the workstation server may be indirectly set incorrectly due to the reference to the current system settings that are recorded in the cloud server do not match the actual system settings of the workstation server, which may cause the problem that the workstation server fails to operate normally after being restarted.

SUMMARY

The present disclosure provides a local server including a BIOS memory and a control circuit. The BIOS memory stores a BIOS code and an actual setting data. The control circuit is coupled to the BIOS memory, and configured to perform a power-on self-test procedure by executing the BIOS code after the local server is started, read a current setting data corresponding to the local server from the cloud server in the power-on self-test procedure (for example, the current setting data corresponding to the local server, which is read after the local server is started, includes a plurality of first current settings), and compare a plurality of actual settings respectively corresponding to the actual setting data of a BIOS setting option with the first current settings. When any of the actual settings does not match the corresponding first current setting, the control circuit sends the actual setting data to the cloud server, so that each of the actual settings overwrites the corresponding first current settings to update the current setting data corresponding to the local server in the cloud server, for example, one of the actual settings updates the corresponding first current setting in the current setting data to the second current setting, thereby updating the current setting data.

The present disclosure provides a server including a first non-volatile memory, a baseboard management controller, a second non-volatile memory and a control circuit. The first non-volatile memory stores a BIOS code and an actual setting data. The actual setting data includes a plurality of actual settings respectively corresponding to a plurality of BIOS setting options. The second non-volatile memory is coupled to the baseboard management controller, and configured to store a current setting data corresponding to the actual setting data. The control circuit is coupled to the first non-volatile memory, and configured to perform a power-on self-test procedure by executing the BIOS code after the server is started, read the current setting data in the power-on self-test procedure, the obtained current setting data including a plurality of first current settings respectively corresponding to the actual settings, and compare each of the actual settings with the corresponding first current setting. When any of the actual settings does not match the corresponding first current setting, the control circuit sends the actual setting data to the second non-volatile memory, so that each of the actual settings overwrites the corresponding first current setting to update the current setting data corresponding to the actual setting data in the second non-volatile memory, for example, to update each of the first current settings in the current setting data respectively to a second current setting.

DETAILED DESCRIPTION

Figure 1:
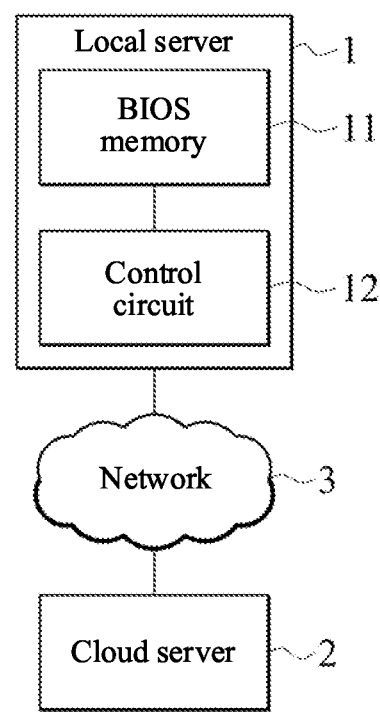
FIG. 1 is a schematic diagram of a first embodiment of a server according to the present disclosure.

FIG. 1 is a schematic diagram of a first embodiment of a server according to the present disclosure. Referring to FIG. 1, the server 1 (hereinafter referred to as local server 1) may be connected to a cloud server 2 through a network 3, the cloud server 2 may be a remote server connected to a plurality of local servers 1 through the network 3, and the cloud server 2 stores a current setting data corresponding to one of the local servers 1 that are connected to the cloud server 2. The current setting data includes a first current setting respectively corresponding to a basic input-output system (BIOS) setting option. The user may operate the cloud server 2 through the network 3 or directly by input device or a computer directly connected to the cloud server 2 by a physical connection, so as to read the current setting data and learn an actual setting data corresponding to the corresponding local server 1 through the current setting data. Based on this, in order to make the actual setting data of the local server 1 consistent with the current setting data, the local server 1 may compare the actual setting data with the corresponding current setting data, and determine whether the actual setting data matches the corresponding current setting data to decide whether to update the current setting data, so that the current setting data stored in the cloud server 2 is consistent with the actual setting data stored in the corresponding local server 1.

In detail, as shown in FIG. 1, the local server 1 includes a BIOS memory 11 and a control circuit 12 coupled to the BIOS memory 11. The BIOS memory 11 stores a BIOS code, and the BIOS memory 11 stores the actual setting data corresponding to a plurality of configurable BIOS setting options corresponding to the BIOS code. As described above, in order to ensure the current setting data stored in the cloud server 2 to be consistent with the actual setting data of the local server 1, in each power-on self-test procedure (that is, in a period before the end of the power-on self-test procedure and about to load the operating system) of the local server 1, if the user wants to directly operate the local server 1 to modify the actual setting data, since the boot process is not allowed to be interrupted arbitrarily during the power-on self-test (POST) procedure, for this operation of directly modifying the actual setting data, the system will allow the user to switch to the BIOS setup menu only in the period before the end of the power-on self-test (POST) procedure and about to load the operating system (that is, after necessary hardware and system settings have been checked and completed), so that after the user modifies the actual setting data in the BIOS setup menu, the control circuit 12 enters a ready to boot phase before loading the operating system and reads the above-mentioned current setting data from the cloud server 2 by executing the BIOS code (step S01), and the control circuit 12 executes the BIOS code to obtain the actual setting data corresponding to the current setting data. The control circuit 12 then compares the current setting data from the cloud server 2 with the actual setting data. The control circuit 12 determines whether the current setting data is consistent with the actual setting data (step S02). If any of the first current settings in the current setting data from the cloud server 2 does not match the corresponding actual setting in the actual setting data (the determination result is "NO") (for example, when the administrator of the local server 1 directly operates the local server 1 to directly modify the actual setting data of the BIOS setting options by operating the local server 1 after the current setting data is stored into the cloud server 2, and does not store the modified actual setting data to the cloud server 2, causing the first current settings to be inconsistent with the corresponding actual settings), the control circuit 12 may send the modified actual setting data including all the actual settings to the cloud server 2 through the network 3 (step S03) to update the current setting data that is stored in the cloud server 2 (hereinafter, the current setting data before the update and the current setting data after the update are respectively referred to as the first current setting data and the second current setting data).

Therefore, the first current setting data in the cloud server 2 is overwritten by the actual setting data from the local server 1, and then the cloud server 2 stores a second current setting data (including a plurality of second current settings) of the local server 1 corresponding to a plurality of BIOS setting options. The second current settings are the modified actual settings of the plurality of BIOS setting options of the local server 1, that is, the second current settings are consistent with the actual settings that are stored in the BIOS memory 11 and respectively correspond to one of the BIOS setting options. The administrator of the local server 1 does not refer to the first current settings of the first current setting data when viewing the BIOS setting options of the local server 1 through the cloud server 2, that is, the administrator may further modify the settings of the local server 1 according to the second current settings of the second current setting data that are respectively correctly corresponding to the current actual settings that is obtained by the control circuit 12.

In an embodiment, in step S01, the control circuit 12 may download the current setting data corresponding to the local server 1 from the cloud server 2, for example, the first current setting data before the update or the second current setting data after the update, and store the current setting data into a buffer. Besides, the control circuit 12 may also store the actual setting data obtained from the BIOS memory 11 into the buffer, to execute a comparison operation of step S02 through the data stored in the buffer. The control circuit 12 may store the current setting data and the actual setting data in different buffers respectively.

In an embodiment, the administrator may store an update setting data corresponding to the actual setting data of the local server 1 into the cloud server 2, and the local server 1 may be connected to the cloud server 2 through the network 3 and check whether the cloud server 2 includes the update setting data corresponding to the local server 1. When the administrator stores the update setting data into the cloud server 2, the local server 1 may update, according to a plurality of update settings included in the update setting data, the actual settings in the respectively corresponding actual setting data, to complete the update of the actual setting data of the local server 1 in an indirect manner of operating the remote server.

Figure 2:
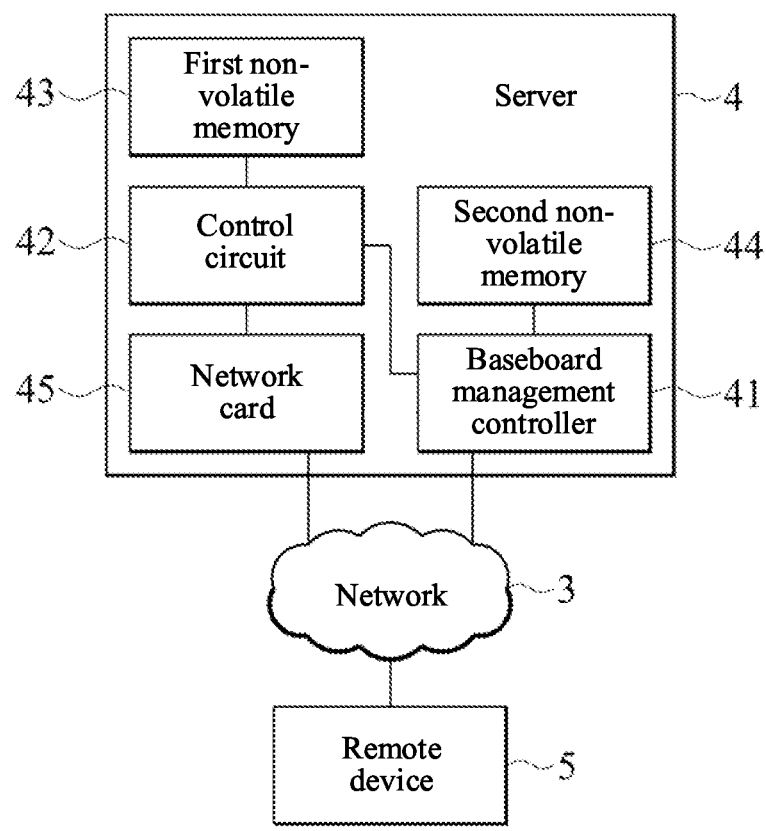
FIG. 2 is a schematic diagram of a second embodiment of a server according to the present disclosure.

Based on this, in each power-on self-test procedure of the local server 1, before step S01 is executed, after the local server 1 is powered on to start or reset, the control circuit 12 executes firmware (BIOS code) such that the local server 1 enters a pre-EFI initialization (PEI) procedure to initialize the control circuit 12, for example, including a central processing unit (CPU), a platform controller hub (PCH) and other core control components. After the PEI procedure is completed, the local server 1 enters a driver execution environment (DXE) procedure to initialize a network card, a memory, a driver and other secondary components. After entering the DXE procedure, the control circuit 12 of the local server 1 is firstly connected to the cloud server 2 through the network 3. In some embodiments, as shown in FIG. 2, FIG. 2 is a schematic diagram of a second embodiment of a server according to the present disclosure. The control circuit 42 is connected to the remote device 5 through the network 3 via a baseboard management controller 41 coupled to the control circuit 42. The control circuit 42 is connected to the remote device 5 through the network 3 via a network card 45. Thereby, in the DXE procedure, after the initialization of the network card 45 is completed, the control circuit 12 of the local server 1 may perform network communication through the network card 45. The control circuit 12 determines whether the cloud server 2 includes the update setting data corresponding to the actual setting data (step S04). When the cloud server 2 does not include the update setting data (the determination result is "NO"), the control circuit 12 executes step S01 to read the current setting data stored in the cloud server 2 (for example, read first current settings, second current settings or the combination of them included in the current setting data previously stored in the cloud server 2), and then executes step S02. On the other hand, in step S04, when the cloud server 2 already includes the update setting data corresponding to the local server 1 (the determination result is "YES"), the control circuit 12 firstly updates the corresponding actual setting data stored in the local server 1 according to the update setting data (step S05), so that each update setting of the update setting data in the cloud server 2 is integrated into the corresponding actual setting in the corresponding local server 1 and the cloud server 2 eliminates the update setting data that has been integrated into the corresponding local server 1, for example, according to the request of the local server 1 for the update setting data of the corresponding local server 1, the cloud server 2 finds and returns the corresponding update setting data, and then the cloud server 2 eliminates the update setting data that is stored in itself and has been sent. The cloud server 2 finds the corresponding update setting data according to an address or an identifier of the corresponding local server 1.

After step S05 of update is completed, the local server 1 is reset (step S06), and the control circuit 12 enters the DXE procedure again to execute step S04 in the power-on self-test procedure after the local server 1 is reset and the PEI procedure is completed again, to determine whether the cloud server 2 includes the above-mentioned update setting data. At this time, since the control circuit 12 has updated the actual setting data stored in the cloud server 2 according to the update setting data sent by the cloud server 2 in the power-on self-test procedure before the reset, in the power-on self-test procedure after the reset, the control circuit 12 determines that the cloud server 2 does not include other update setting data corresponding to the actual setting data of the cloud server 2 (the determination result is "NO") by requesting the cloud server 2 again for the update setting data corresponding to the local server 1 and based on the return information of the cloud server 2, and the control circuit 12 skips step S05 of updating the BIOS setting options and step S06 of resetting the system and then executes the boot process continuously, and the user is allowed to manually modify the actual setting data in the BIOS setup menu until the period before the end of the POST procedure and about to load the operating system. The user inputs an operation instruction through peripheral input device (for example, a keyboard) physically connected to the local server 1 so as to control the control circuit 12 to modify the actual setting data corresponding to the BIOS setup menu. After the user manually modifies the actual setting data or in the period in which the user does not use the peripheral device to switch to the BIOS setup menu that can be manually modified so as to exceed the period in which the user is allowed to manually switch to the BIOS setup menu, in the ready to boot phase before the end of the DXE, the actual setting data stored by the control circuit 12 is the actual setting data obtained by selectively integrating the update setting data stored in the cloud server 2 and selectively manually modifying it by the user. In the ready to boot phase before the end of the DXE, the control circuit 12 executes step S01 to read the current setting data obtained by the cloud server 2 and then executes step S02.

In step S02, since the control circuit 12 has already updated the actual settings of the actual setting data, the control circuit 12 can determine that at least one actual setting in the actual setting data is inconsistent with the corresponding first current setting in the current setting data (the determination result is "NO") in step S02. For example, taking the above-mentioned first current setting as an example, if the control circuit 12 updates one of the corresponding actual settings of the actual setting data with one of the update settings in the update setting data, for example, the control circuit 12 updates the first actual setting in the actual setting data, then the control circuit 12 determines that the updated first actual setting is different from the corresponding first current setting. Next, the control circuit 12 sends the entire actual setting data including the first actual settings to the cloud server 2 to update the entire update setting data (step S03), so that the actual setting data stored in the BIOS memory 11 is consistent with the current setting data stored in the cloud server 2. In step S03, the control circuit 12 may not send the entire actual setting data to the cloud server 2. Instead, the control circuit 12 only sends the difference between the actual setting data and the current setting data after the comparison between them, for example, after the control circuit 12 determines that only the first actual setting in the actual setting data is different from the corresponding first current setting, the control circuit 12 only sends the first actual setting to the cloud server 2 to update the corresponding first current setting stored in the cloud server 2.

In an embodiment, in step S02, when the control circuit 12 determines that the actual setting data of the local server 1 is consistent with the corresponding current setting data (the determination result is "YES"), for example, after the current setting data is updated to the second current setting data, the control circuit 12 determines that the actual setting data is consistent with the second current setting data, and the control circuit 12 executes the BIOS code to continue executing the boot process of the local server 1 (step S07). In step S07, the control circuit 12 enables the local server 1 to enter a boot device selection (BDS) procedure, and the control circuit 12 continues the boot process by using the actual setting data obtained by selectively integrating the update setting data stored in the cloud server 2 and selectively manually modifying it by the user. Furthermore, when the control circuit 12 determines that the actual setting data of the local server 1 is inconsistent with the corresponding current setting data (the determination result is "NO"), for example, the actual setting data is inconsistent with the first current setting data, the control circuit 12 also continues executing the boot process of the local server 1 after executing step S03 (step S07).

In an embodiment, the cloud server 2 may detect, when it is started, whether the cloud server itself includes an update file for storing the update setting data corresponding to the actual setting data of the local server 1, and if the update file does not exist, the cloud server 2 creates the update file according to a default file name corresponding to an identifier of the corresponding local server 1. The administrator of the local server 1 may find the update file according to the above-mentioned default file name through an interface of a web page, and create or modifies in the update file the to-be-updated first current setting corresponding to at least one BIOS setting option of the local server 1 as at least one update setting of the update setting data. Furthermore, the update setting data included in the update file may only correspond to part of the BIOS setting options, for example, the local server 1 includes 50 BIOS setting options, and the update setting data may only correspond to the actual setting data of three of the BIOS setting options, that is, when the local server 1 updates its actual setting data with the update setting data, the local server 1 can only update three corresponding actual settings in its actual setting data, or the actual setting data corresponding to other number of BIOS setting options with the update setting data.

In an embodiment, the local server 1 communicates with the cloud server 2 through an application programming interface (API) using representational state transfer (REST) protocol technology, so as to read the current setting data from the cloud server 2 in step S01 and send the actual setting data of the corresponding local server 1 to the cloud server 2 in step S03. Besides, the cloud server 2 may also display the first current settings and the second current settings mentioned above through the web page-based application programming interface, so that the administrator refers to the current setting data corresponding to the local server 1 to learn the history of the modification of the actual setting data of the corresponding local server 1 and the current latest state.

Figure 4:
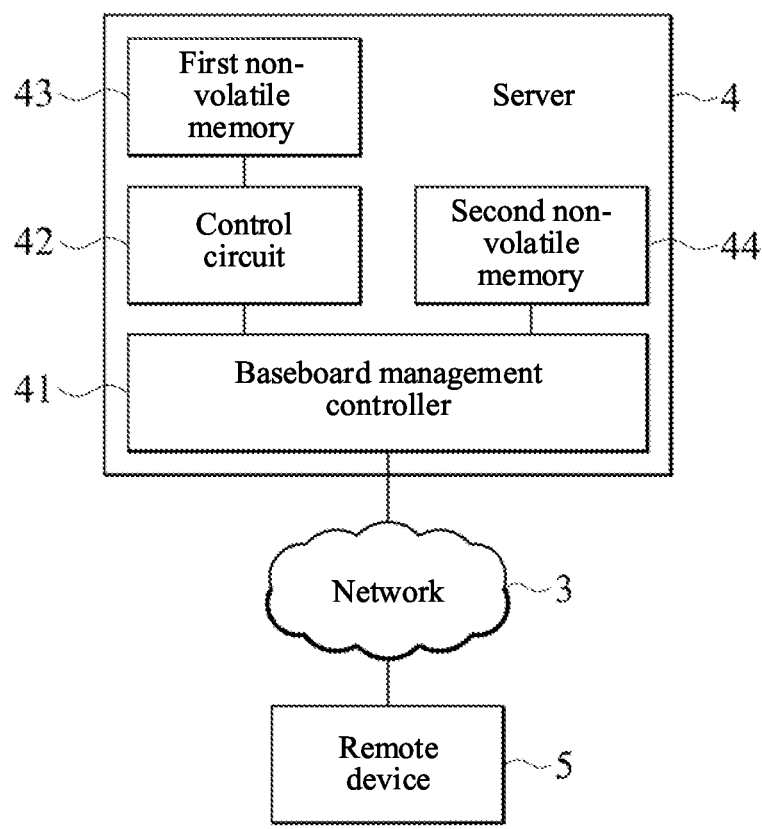
FIG. 4 is a schematic diagram of a third embodiment of a server according to the present disclosure.

Referring to FIG. 4, FIG. 4 is a schematic diagram of a third embodiment of a server according to the present disclosure. FIG. 4 shows a server 4. The server 4 includes a baseboard management controller 41, a control circuit 42, a first non-volatile memory 43 and a second non-volatile memory 44. The first non-volatile memory 43 is coupled to the control circuit 42, the control circuit 42 is coupled to the baseboard management controller 41, the baseboard management controller 41 is coupled to the second non-volatile memory 44, and the baseboard management controller 41 has a network connection function for connection to a remote device 5. The remote device 5 may also be implemented by the cloud server 2.

The first non-volatile memory 43 is the above-mentioned BIOS memory 11, and the first non-volatile memory 43 stores the above-mentioned BIOS code and the actual setting data corresponding to the plurality of BIOS setting options, which will not be repeated here. The second non-volatile memory 44 is configured to store a current setting data corresponding to the actual setting data stored in the first non-volatile memory 43 and a corresponding update file. In other words, the second embodiment is different from the first embodiment in that the current setting data, corresponding to the actual setting data of the BIOS setting option executed corresponding to the BIOS code in the first non-volatile memory 43, and the update setting data are stored in the second non-volatile memory 44 coupled to the baseboard management controller 41 in the server 4 rather than in other servers. Furthermore, in the second embodiment, the administrator of the server 4 may operate a remote device 5 to connect to the baseboard management controller 41 of the server 4 through the network 3, and the administrator may store the update setting data into the second non-volatile memory 44 through a network interface of the baseboard management controller 41, that is, the baseboard management controller 41 may receive an update setting data from the remote device 5 and store the update setting data into the second non-volatile memory 44.

Figure 3:
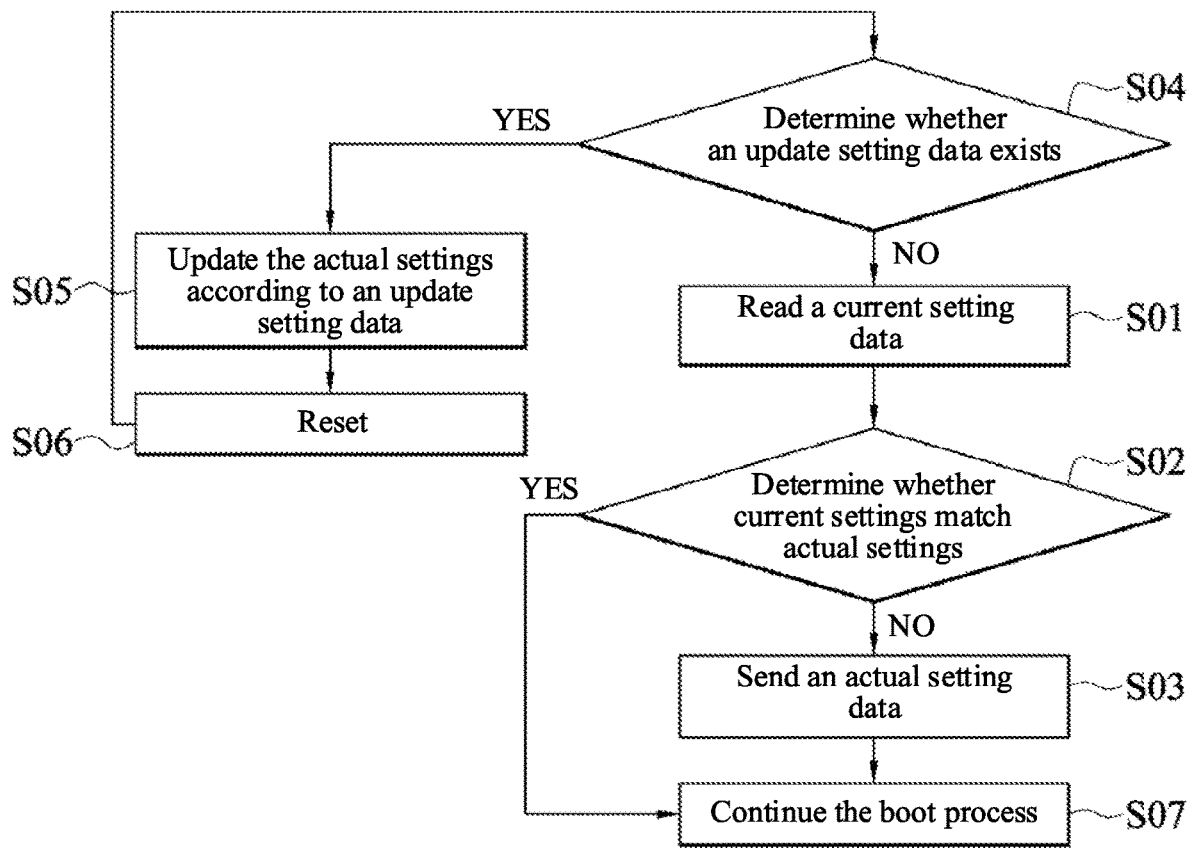
FIG. 3 is a flowchart of an embodiment of a method for synchronizing an actual setting data and a current setting data used by the server according to the present disclosure.

Based on this, referring to FIG. 3 and FIG. 4 together, in the power-on self-test procedure of the server 4, that is, at the start of the power-on self-test procedure or before the power-on self-test procedure is about to be performed, since the server 4 generally performs the power-on self-test after the control circuit 42 including its main components is initialized (for example, the central processing unit (CPU), the platform controller hub (PCH) and other main components related to the execution of the BIOS code are initialized) by the control circuit 42 loading the BIOS code and its corresponding actual setting data, updating the actual setting data with the update setting data is performed at the start of the power-on self-test procedure (that is, after the initialization of the network card is completed in the DXE procedure) or before the power-on self-test procedure is about to be performed (that is, after the control circuit 42 is initialized to be able to communicate with the baseboard management controller 41). The control circuit 42 confirms through the baseboard management controller 41 whether the second non-volatile memory 44 includes the update setting data of the BIOS setting option (step S04), or the control circuit 42 is connected to the network 3 through the baseboard management controller 41 to communicate with the cloud server 2, and the control circuit 42 may send a signal to the baseboard management controller 41 so that the baseboard management controller 41 reports whether the second non-volatile memory 44 includes the update setting data. When the second non-volatile memory 44 includes the update setting data (the determination result is "YES"), for example, the administrator has stored the update setting data into the second non-volatile memory 44 through the above-mentioned remote device 5, the control circuit 42 obtains the update setting data through the baseboard management controller 41. The control circuit 42 may send a control signal to the baseboard management controller 41 so that the baseboard management controller 41 returns the update setting data stored in the second non-volatile memory 44, and the control circuit 42 then update the BIOS setting option according to the update setting data (step S05).

After the update of the setting data of the BIOS setting options is completed, the server 4 is reset (step S06). In the power-on self-test procedure after the reset, that is, in the period before the end of the power-on self-test procedure and about to load the operating system, in more detail, in the ready to boot phase before the end of the DXE, the control circuit 42 executes step S04 again to determine whether the update setting data exists. At this time, since the control circuit 42 has already updated before the server 4 is reset the actual setting data corresponding to part of the BIOS setting options according to the update setting data and the update setting data that has been used to update the actual setting data is eliminated from the second non-volatile memory 44 by the baseboard management controller 41, that is, after the baseboard management controller 41 sends the update data to the control circuit 42 to update the actual setting data, the baseboard management controller 41 takes the update setting data in the second non-volatile memory 44 as the update setting data that has been used to update the actual setting data, in the power-on self-test procedure after the reset, the baseboard management controller 41 reports that the second non-volatile memory 44 does not include the update setting data, so that the control circuit 42 determines that the second non-volatile memory 44 does not include the update setting data (the determination result is "NO"). In contrast to the case that the update setting data that has been used to update the actual setting data is eliminated from the second non-volatile memory 44 by the baseboard management controller 41, the baseboard management controller 41 may also only mark the update data that has been used to update the actual setting data, or directly mark the update file that has been used and includes the update setting data to indicate that the update setting data included in the update file has been used. In the power-on self-test procedure after the reset, the baseboard management controller 41 reports that the second non-volatile memory 44 does not include the unused update setting data, so that the control circuit 42 determines that the second non-volatile memory 44 does not include the unused update setting data (the determination result is "NO"), and the control circuit 42 reads the current setting data stored in the second non-volatile memory 44 (step S01). The control circuit 42 may send the control signal again to the baseboard management controller 41 so that the baseboard management controller 41 returns the current setting data stored in the second non-volatile memory 44.

The control circuit 42 then determines whether the actual setting data stored in the first non-volatile memory 43 is consistent with the corresponding current setting data in the second non-volatile memory 44 (step S02). Since the control circuit 42 has already updated the actual setting data with the update setting data, at this time, the control circuit 42 generates a determination result of inconsistency (the determination result is "NO"), the control circuit 42 then sends the updated actual setting data to the baseboard management controller 41 (step S03), so that the baseboard management controller 41 stores the updated actual setting data in the second non-volatile memory 44, and the updated actual setting data overwrites the current setting data previously stored in the second non-volatile memory 44 as the latest current setting data (hereinafter referred to as a current setting data including second current settings). Afterwards, if the administrator does not store the update setting data in the second non-volatile memory 44 through the baseboard management controller 41 and the administrator does not modify the setting data of the BIOS setting options through the boot menu or get connected to the server 4 through a tool to directly modify the actual setting data when the control circuit 42 executes the BIOS code, in each power-on self-test procedure, the control circuit 42 will generate, when step S04 is executed, a determination result that the update setting data does not exist (the determination result is "NO"), and execute steps S01 and S02 accordingly, and the control circuit 42 will generate, when step S02 is executed, a determination result that the actual setting data of the BIOS setting options corresponding to the BIOS code is consistent with the current setting data including the second current settings (the determination result is "YES"). When connecting to the baseboard management controller 41 through the remote device 5 to view the BIOS setting options of the server 4, the administrator of the local server 1 will not refer to the first current settings before the update after each of the actual settings in the actual setting data of the local server 1 has been updated to the each corresponding second current setting, that is, the administrator may maintain or set the server 4 according to the actual and correct second current settings.

In the second embodiment, the control circuit 42 may also determine, in step S02, whether the actual setting data stored in the first non-volatile memory 43 is consistent with the current setting data stored in the second non-volatile memory 44 through the above-mentioned buffer, which will not be repeated here.

Based on the above, according to an embodiment of the server of the present disclosure, whether the administrator stores the current setting data corresponding to the actual setting data of the local server through the cloud server or stores the current setting data corresponding to the actual setting data of the server through the non-volatile memory plugged into the baseboard management controller, the server can ensure the consistency between the two. Thereby, the administrator will not refer to the incorrect current setting data that is inconsistent with the actual setting data (for example, the current setting data that includes the first current settings before the update), that is, the administrator may set the server further according to the actual and correct current setting data that is synchronous in real time with the actual setting data.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A local server, configured to be connected to a cloud server, wherein the local server comprises:
   a BIOS memory, storing a BIOS code and an actual setting data, wherein the actual setting data comprises a plurality of actual settings respectively corresponding to a plurality of BIOS setting options; and
   a control circuit, coupled to the BIOS memory and configured to read a first current setting data corresponding to the local server from the cloud server in a power-on self-test procedure of the local server, the first current setting data comprising a plurality of first current settings respectively corresponding to the BIOS setting options, and compare the actual settings respectively corresponding to the BIOS setting options with the first current settings, wherein when any of the actual settings does not match the corresponding first current setting, the control circuit sends the actual setting data to the cloud server, so that the actual settings overwrite the corresponding first current settings to update the first current settings to a plurality of second current settings, thereby obtaining a second current setting data comprising the second current settings by connection to the cloud server through a network.

2. The local server according to claim 1, wherein before reading the first current setting data, the control circuit further determines in the power-on self-test procedure whether the cloud server comprises an update setting data corresponding to the local server, and when the cloud server does not comprise the update setting data, the control circuit starts to read the first current setting data from the cloud server.

3. The local server according to claim 2, wherein when the cloud server comprises the update setting data, the control circuit updates the corresponding actual settings according to the update setting data, the local server is reset after the actual settings are updated, the control circuit determines after the local server is reset that the cloud server does not comprise the update setting data, the control circuit reads the first current setting data to compare the updated actual settings with the corresponding first current settings.

4. The local server according to claim 2, wherein the update setting data is stored in an update file having a default file name and corresponding to the local server, the update file is created by the cloud server according to an identifier of the local server and the default file name, and the control circuit reads the first current setting data from the update file according to the default file name.

5. The local server according to claim 1, wherein the control circuit reads the first current setting data from the cloud server through an application programming interface using representational state transfer protocol technology, and sends the actual setting data to the cloud server through the application programming interface, and the cloud server further provides the first current setting data and the second current setting data through the web page-based application programming interface.

6. The local server according to claim 1, wherein the control circuit obtains the first current setting data from the cloud server, the control circuit stores the first current setting data into a buffer, the control circuit obtains the actual setting data from the BIOS memory, the control circuit stores the actual setting data into the buffer, and the control circuit performs comparison according to the first current setting data and the actual setting data stored in the buffer.

7. The local server according to claim 4, wherein the cloud server detects whether the cloud server itself comprises the update file for storing the update setting data corresponding to the actual setting data, and if the update file does not exist, the cloud server creates the update file according to the identifier and the default file name.

8. The local server according to claim 4, wherein the update setting data stored in the update file corresponds to at least one of the BIOS setting options.

9. A server, comprising:
a first non-volatile memory, storing a BIOS code and an actual setting data, wherein the actual setting data comprises a plurality of actual settings respectively corresponding to a plurality of BIOS setting options;
a baseboard management controller;
a second non-volatile memory, coupled to the baseboard management controller and configured to store a current setting data, wherein the current setting data comprises a plurality of first current settings respectively corresponding to the BIOS setting options; and
a control circuit, coupled to the first non-volatile memory and configured to read the current setting data in a power-on self-test procedure of the server and compare the actual settings respectively corresponding to the BIOS setting options with the first current settings, wherein when any of the actual settings does not match the corresponding first current setting, the control circuit sends the actual setting data to the second non-volatile memory, so that the actual settings overwrite the corresponding first current settings to update the first current settings to a plurality of second current settings.

10. The server according to claim 9, wherein the baseboard management controller has a network connection function for connection to a remote device, and the baseboard management controller further receives an update setting data corresponding to the BIOS setting options from the remote device through the network connection function and stores the update setting data into an update file having a default file name in the second non-volatile memory.

11. The server according to claim 9, wherein before reading the current setting data, the control circuit further determines in the power-on self-test procedure whether the second non-volatile memory comprises an update setting data corresponding to the BIOS setting options, and when the second non-volatile memory does not comprise the update setting data, the control circuit starts to read the current setting data from the second non-volatile memory.

12. The server according to claim 11, wherein when the second non-volatile memory comprises the update setting data, the control circuit updates the corresponding actual settings according to the update setting data, the server is reset after the actual settings are updated, the control circuit determines after the server is reset that the second non-volatile memory does not comprise the update setting data, the control circuit reads the current setting data to compare the updated actual settings with the corresponding first current settings.

13. The server according to claim 11, wherein the update setting data is stored in an update file having a default file name, the update file is created by the baseboard management controller according to the default file name, and the control circuit reads the current setting data from the update file according to the default file name.

14. The server according to claim 11, wherein the control circuit sends a signal to the baseboard management controller, and the baseboard management controller reports whether the second non-volatile memory comprises the update setting data according to the signal to perform determination.

15. The server according to claim 12, wherein the control circuit sends another signal to the baseboard management controller, so that the baseboard management controller returns the update setting data stored in the second non-volatile memory according to the another signal, and the control circuit updates the corresponding actual settings according to the update setting data.

16. The server according to claim 12, wherein after the actual settings of the server are updated, and the baseboard management controller eliminates the update setting data that has been used to update the actual settings from the second non-volatile memory.

17. The server according to claim 12, wherein after the actual settings of the server are updated, and the baseboard management controller marks the update setting data that has been used to update the actual settings from the second non-volatile memory.

18. The server according to claim 13, wherein the baseboard management controller detects whether the second non-volatile memory comprises the update file for storing the update setting data corresponding to the actual setting data, and if the update file does not exist, the baseboard management controller creates the update file according to the identifier and the default file name.

19. The server according to claim 13, wherein the update setting data stored in the update file corresponds to at least one of the BIOS setting options.

20. The server according to claim 9, wherein the control circuit obtains the current setting data from the second non-volatile memory, the control circuit stores the current setting data into a buffer, the control circuit obtains the actual setting data from the first non-volatile memory, the control circuit stores the actual setting data into the buffer, and the control circuit performs comparison according to the current setting data and the actual setting data stored in the buffer.

* * * * *